United States Patent
Isono

(10) Patent No.: US 12,535,846 B2
(45) Date of Patent: Jan. 27, 2026

(54) OPERATION AMOUNT DETECTION DEVICE

(71) Applicant: AISIN CORPORATION, Aichi (JP)

(72) Inventor: Hiroshi Isono, Kariya (JP)

(73) Assignee: AISIN CORPORATION, Kariya (JP)

( * ) Notice: Subject to any disclaimer, the term of this patent is extended or adjusted under 35 U.S.C. 154(b) by 24 days.

(21) Appl. No.: 18/701,799

(22) PCT Filed: Aug. 17, 2022

(86) PCT No.: PCT/JP2022/031114
§ 371 (c)(1),
(2) Date: Apr. 16, 2024

(87) PCT Pub. No.: WO2023/119723
PCT Pub. Date: Jun. 29, 2023

(65) Prior Publication Data
US 2025/0138569 A1     May 1, 2025

(30) Foreign Application Priority Data
Dec. 24, 2021   (JP) ................. 2021-211493

(51) Int. Cl.
*G05G 1/38*     (2008.04)
*G05G 1/44*     (2008.04)
(Continued)

(52) U.S. Cl.
CPC .......... *G05G 1/38* (2013.01); *G05G 1/44* (2013.01); *G05G 5/03* (2013.01); *G05G 5/05* (2013.01); *G05G 2505/00* (2013.01)

(58) Field of Classification Search
None
See application file for complete search history.

(56) References Cited

U.S. PATENT DOCUMENTS 9,740,233 B2 *   8/2017   Fujiwara .............. G05G 1/38

FOREIGN PATENT DOCUMENTS

| JP | 2010-231367 A | | 10/2010 | |
| JP | 2018141729 A | * | 9/2018 | |
| JP | 2021060092 A | * | 4/2021 | ......... B60T 13/741 |

OTHER PUBLICATIONS

International Search Report for PCT/JP2022/031114, dated Nov. 8, 2022.

* cited by examiner

*Primary Examiner* — Vicky A Johnson
(74) *Attorney, Agent, or Firm* — Sughrue Mion, PLLC

(57) ABSTRACT

An operation amount detection device including a first member rotational about a rotation center axis by an operation force input to a pedal and transmitting rotation torque. A second member receives, from a reaction force member, a reaction force of the transmitted torque, the second member being rotatable about the rotation center axis and axially movable relative to the first member and being interposed between the first member and the reaction force member. A conversion mechanism converts rotation of the first member into a relative movement of the first member and the second member axially to convert the rotation torque into a thrust force in the axial direction and an elastic body is provided apart from the reaction force member and configured to be elastically deformed by the thrust force. A detection element is fixed to the elastic body and detects a deformation amount of the elastic body.

8 Claims, 10 Drawing Sheets

(51) Int. Cl.
*G05G 5/03* (2008.04)
*G05G 5/05* (2006.01)

OPERATION AMOUNT DETECTION DEVICE

CROSS REFERENCE TO RELATED APPLICATIONS

This application is a National Stage of International Application No. PCT/JP2022/031114 filed Aug. 17, 2022, claiming priority based on Japanese Patent Application No. 2021-211493 filed Dec. 24, 2021, the entire contents of which are incorporated in their entirety.

TECHNICAL FIELD

This disclosure relates to an operation amount detection device.

BACKGROUND ART

In related art, as an operation amount detection device that detects an operation amount of a pedal of a pedal device, a device is known in which a strain body serving as a detection element is provided on a reaction force member that is connected to the pedal device and that transmits a reaction force against an operation force of the pedal to the pedal device, and a strain amount of the strain body is detected.

CITATION LIST

Patent Literature

PTL 1: JP2010-231367A

SUMMARY OF THE DISCLOSURE

Technical Problem

However, in the related art, since the strain body is provided on the reaction force member, there is a problem in that an arrangement of the strain body is restricted by a shape or the like of the reaction force member.

An object of this disclosure is to provide an operation amount detection device in which an arrangement of a detection element is less likely to be restricted by a reaction force member.

Solution to Problem

An operation amount detection device according to this disclosure includes: a first member configured to rotate about a rotation center axis by an operation force input to a pedal and transmit a rotation torque; a second member configured to receive, from a reaction force member, a reaction force of the rotation torque transmitted from the first member, the second member being rotatable about the rotation center axis and movable relative to the first member in an axial direction of the rotation center axis, and being interposed between the first member and the reaction force member; a conversion mechanism configured to convert rotation of the first member into a relative movement of the first member and the second member in the axial direction to convert the rotation torque into a thrust force which is a force in the axial direction; an elastic body provided apart from the reaction force member and configured to be elastically deformed by the thrust force; and a detection element fixed to the elastic body and configured to detect a deformation amount of the elastic body.

According to such a configuration, since the detection element is fixed to the elastic body provided apart from the reaction force member, an arrangement of the detection element is less likely to be restricted by the reaction force member.

In the operation amount detection device, for example, the elastic body and the detection element are positioned between the first member and the second member in the axial direction and rotate about the rotation center axis integrally with the first member or the second member.

According to such a configuration, since the elastic body and the detection element rotate integrally with the first member or the second member about the rotation center axis, a configuration (bearing) of rotatably supporting the elastic body, the detection element, and the first member or the second member is easily simplified as compared with a configuration in which the elastic body and the detection element rotate separately from the first member and the second member.

The operation amount detection device includes, for example, a support member including two wall portions that are apart from each other in the axial direction and that support the first member and the second member such that the first member and the second member are rotatable about the rotation center axis. The first member and the second member are positioned between the two wall portions, and relatively move in directions apart from each other in the axial direction by the operation force, and the first member is pressed against one of the wall portions.

According to such a configuration, since the first member is pressed against the one of the wall portions, an occurrence of rattling of the first member in the axial direction is prevented.

In the operation amount detection device, for example, the elastic body and the detection element are positioned between the two wall portions and fixed to the other one of the wall portions.

According to such a configuration, wiring routing and assembling workability of the detection element are improved.

The operation amount detection device includes a support member including two wall portions that are apart from each other in the axial direction and that support the first member and the second member such that the first member and the second member are rotatable about the rotation center axis. The first member and the second member relatively move in directions approaching each other in the axial direction by the operation force and sandwich one of the wall portions.

According to such a configuration, since the first member and the second member sandwich the one of the wall portions, an occurrence of rattling of the first member and the second member in the axial direction is prevented.

In the operation amount detection device, for example, the elastic body and the detection element are positioned outside the two wall portions and fixed to the one of the wall portions.

According to such a configuration, the wiring routing and the assembling workability of the detection element are improved.

In the operation amount detection device, for example, the first member constitutes a link of a parallel link.

According to such a configuration, a movement trajectory of the pedal is easily brought close to a straight line by the parallel link.

DESCRIPTION OF EMBODIMENTS

Hereinafter, embodiments disclosed here will be described. Configurations (technical features) of the embodiments to be described below, and operations and results (effects) of the configurations are examples.

The following plurality of embodiments include the same components. The same components are denoted by the same reference signs, and redundant description thereof is omitted. The drawings are schematic, and dimensional relationships of elements, ratios of elements, and the like may be different from actual ones. In addition, the drawings also include portions having different dimensional relationships and ratios from each other. In addition, in the present specification, an initial number is used only for distinguishing parts, members, portions, positions, directions, and the like, and does not indicate an order or priority.

First Embodiment

Figure 1:
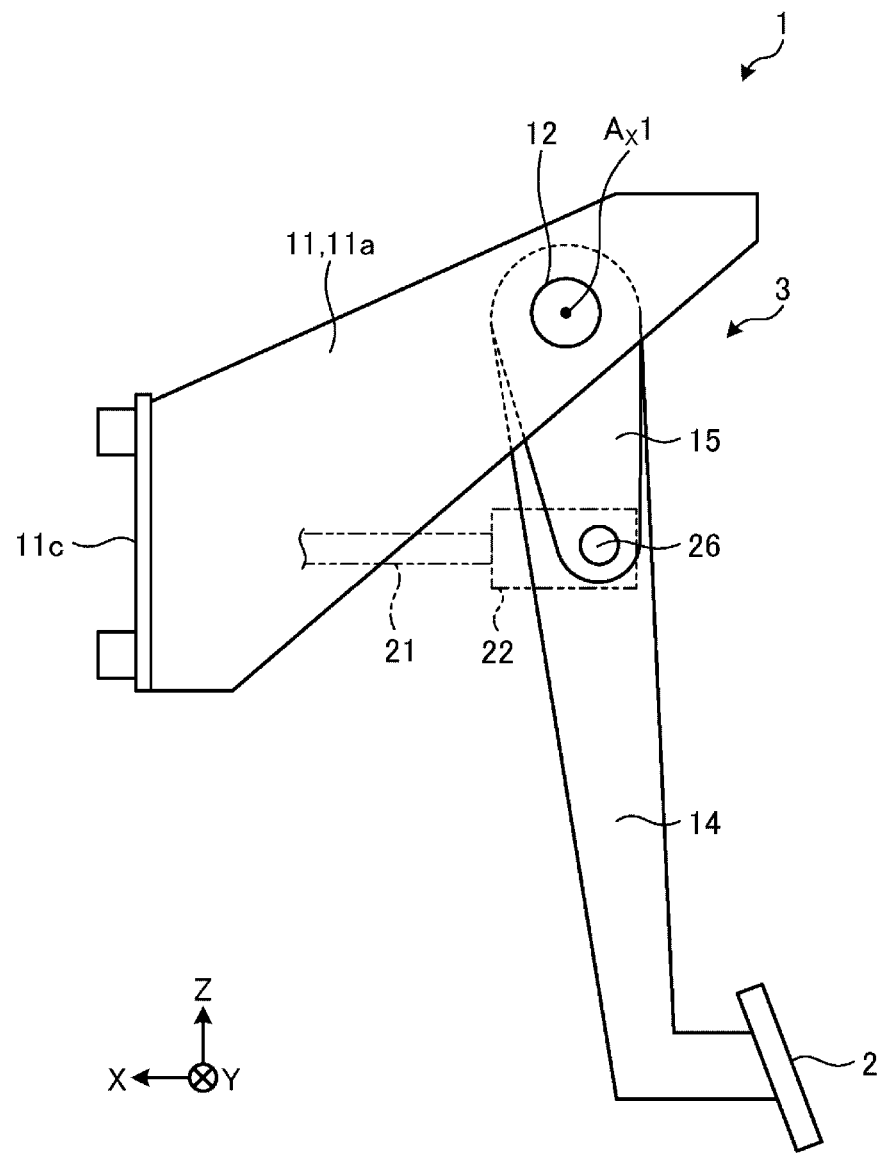
FIG. 1 is a side view showing a pedal device according to a first embodiment.
Figure 2:
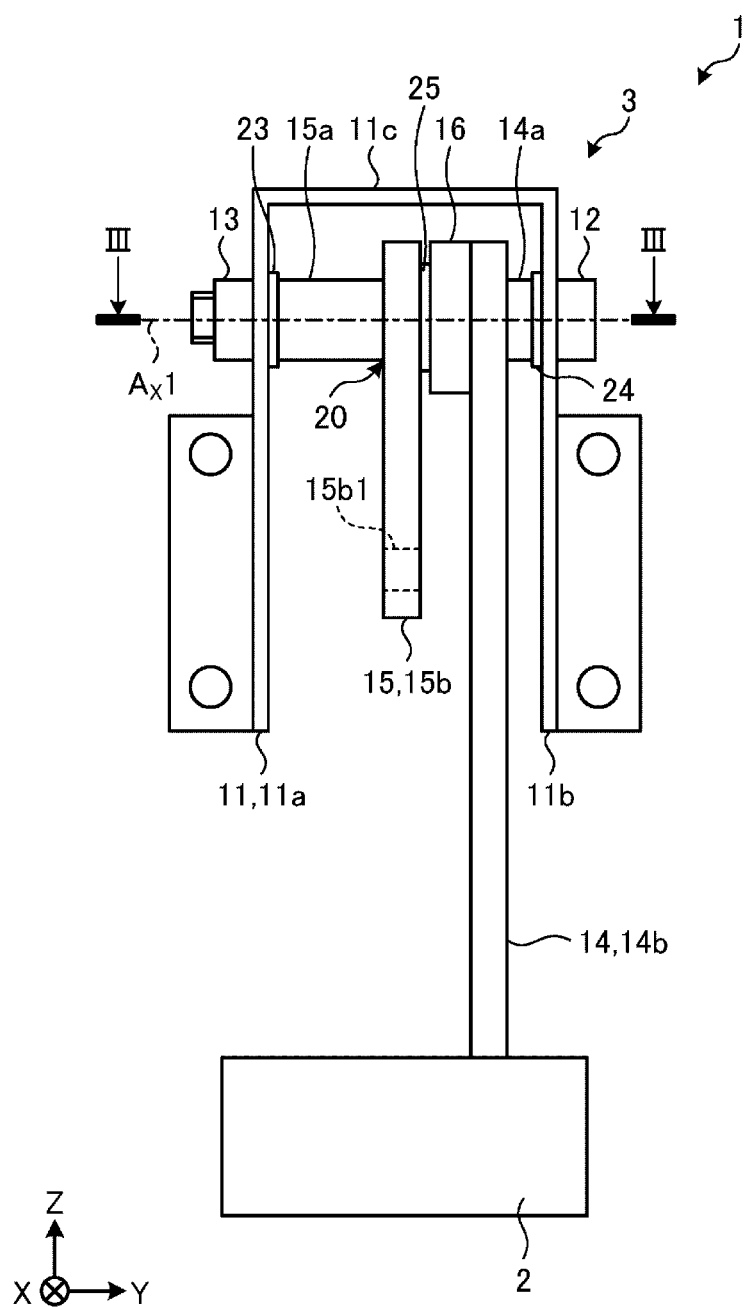
FIG. 2 is a front view showing the pedal device according to the first embodiment.

FIG. 1 is a side view showing a pedal device 1 according to a first embodiment. FIG. 2 is a front view showing the pedal device 1 according to the first embodiment.

The pedal device 1 shown in FIGS. 1 and 2 is a brake pedal device mounted on a vehicle. It should be noted that the pedal device 1 may be an accelerator pedal device.

In the following description, for convenience, three directions orthogonal to one another are defined. An X direction corresponds to a front in a front-rear direction of the vehicle. A Y direction corresponds to one side in a width direction of the vehicle. A Z direction corresponds to an upward direction in a vertical direction of the vehicle.

The pedal device 1 includes a pedal 2 and an operation amount detection device 3. The pedal 2 has, for example, a plate shape, and is subjected to a depression operation by an operator. The operation amount detection device 3 detects and outputs an operation amount of the pedal 2.

Figure 3:
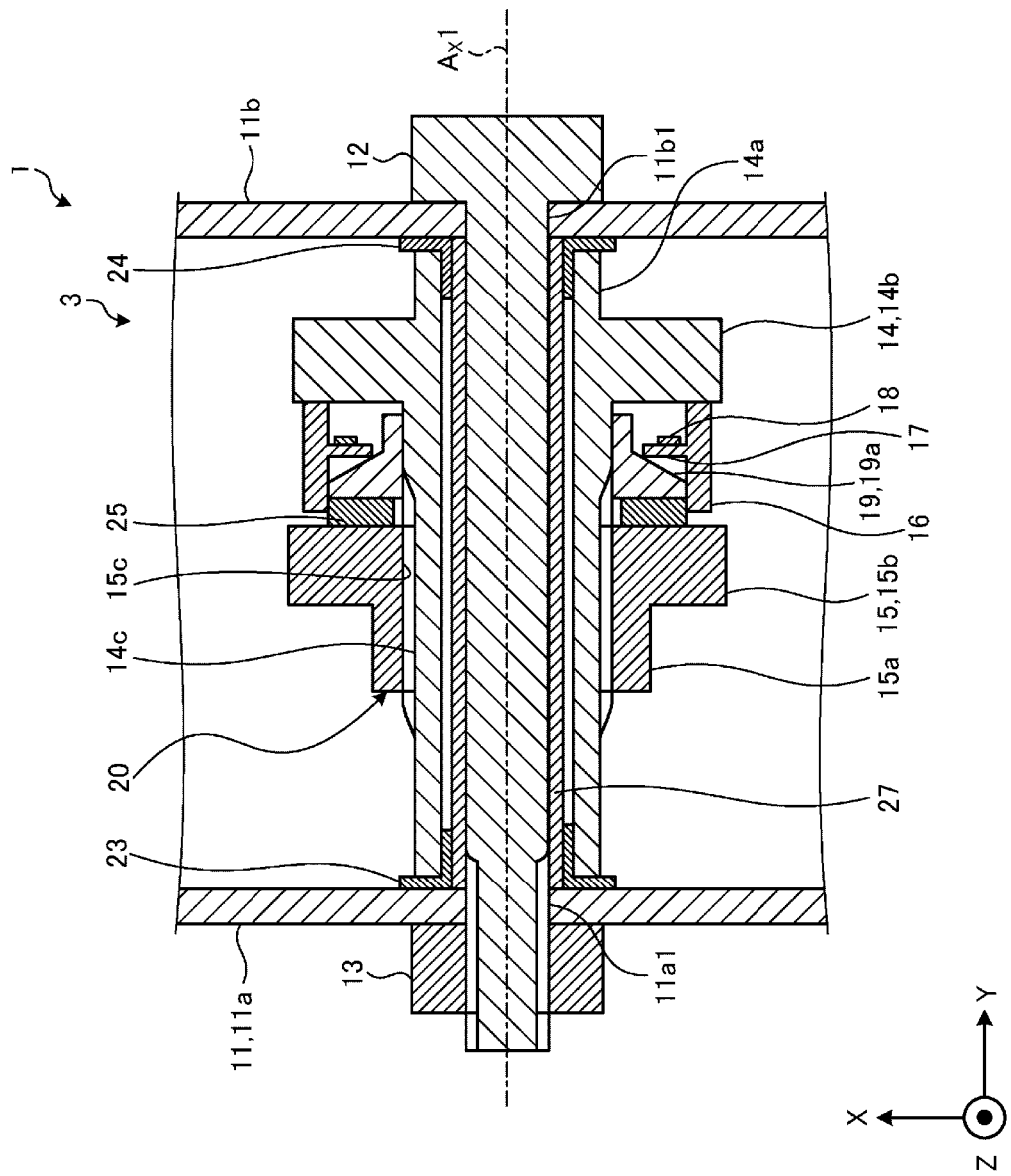
FIG. 3 is a cross-sectional view taken along a line III-III in FIG. 2.

FIG. 3 is a cross-sectional view taken along a line III-III in FIG. 2. As shown in FIGS. 2 and 3, the operation amount detection device 3 includes a support member 11, a bolt 12, a nut 13, lever members 14 and 15, a support member 16, an elastic body 17, a detection element 18, a pressing member 19, and a conversion mechanism 20.

The support member 11 includes two wall portions 11a and 11b and a connection wall portion 11c. The two wall portions 11a and 11b are apart from each other in the Y direction. In other words, the two wall portions 11a and 11b are apart from each other in an axial direction of a rotation center axis Ax1 extending in the Y direction. The wall portions 11a and 11b are provided with through holes 11a1 and 11b1, respectively. The wall portions 11a and 11b are fixed to a vehicle body of the vehicle. The connection wall portion 11c connects end portions of the two wall portions 11a and 11b in the Z direction.

As shown in FIG. 3, the bolt 12 extends in the axial direction of the rotation center axis Ax1 and is inserted into the through holes 11a1 and 11b1. The bolt 12 is joined to the nut 13 and fixed to the two wall portions 11a and 11b. The bolt 12 is inserted into a collar 27.

The lever member 14 rotates about the rotation center axis Ax1 by an operation force input to the pedal 2, and transmits rotation torque. Specifically, the lever member 14 includes a shaft portion 14a and an arm portion 14b. The shaft portion 14a is formed in a cylindrical shape about the rotation center axis Ax1. The bolt 12 is inserted into the shaft portion 14a. Both end portions of the shaft portion 14a in the axial direction are rotatably supported by bearings 23 and 24. In addition, a helical spline 14c is formed on an outer peripheral surface of the shaft portion 14a. The arm portion 14b extends from the shaft portion 14a in a radial direction of the rotation center axis Ax1. The pedal 2 is fixed to a tip end portion of the arm portion 14b. The lever member 14 is an example of a first link.

The lever member 15 is rotatable about the rotation center axis Ax1 and movable relative to the lever member 14 in the axial direction of the rotation center axis Ax1. Specifically, the lever member 15 includes a shaft portion 15a and an arm portion 15b. The shaft portion 15a is formed in a cylindrical shape about the rotation center axis Ax1. The shaft portion 15a of the lever member 14 is inserted into the shaft portion 15a. A helical spline 15c is formed on an inner peripheral surface of the shaft portion 15a. The helical spline 15c meshes with the helical spline 14c. The arm portion 15b extends from the shaft portion 15a in the radial direction of the rotation center axis Ax1. A reaction force member 22 is connected to the tip end portion of the arm portion 14b via a shaft 26. The reaction force member 22 is, for example, a crat screw. The reaction force member 22 is connected to an operating rod 21. The reaction force member 22 inputs a reaction force against the rotation torque transmitted from the lever member 14 to the lever member 15.

The conversion mechanism 20 includes the shaft portion 14a in which the helical spline 14c is formed, and the shaft portion 15a in which the helical spline 15c is formed. The conversion mechanism 20 converts rotation of the lever member 14 into a relative movement between the lever member 14 and the lever member 15 in the axial direction, thereby converting the rotation torque into a thrust force which is a force in the axial direction. Specifically, the conversion mechanism 20 converts the rotation of the lever member 14 into a movement of the lever member in a direction in which the arm portion 14b of the lever member 14 and the arm portion 15b of the lever member 15 approach each other, thereby converting the rotation torque into the thrust force which is the force in the axial direction.

The support member 16 is positioned between the arm portion 14b and the arm portion 15b. The support member 11 is formed in a cylindrical shape about the rotation center axis Ax1.

The elastic body 17 protrudes from an inner peripheral surface of the support member 16 toward the rotation center axis Ax1. The elastic body 17 is formed in a circular plate shape about the rotation center axis Ax1. The elastic body 17 is provided apart from the reaction force member 22.

The detection element 18 is fixed to the elastic body 17 and detects a deformation amount (strain amount) of the elastic body 17. For example, a plurality of detection elements 18 are provided at intervals about the rotation center axis Ax1. The detection element 18 is, for example, a strain gauge.

The pressing member 19 is positioned between the arm portion 14b and the arm portion 15b inside the support member 16. The pressing member 19 is formed in a tubular shape about the rotation center axis Ax1. The pressing member 19 has a pressing surface 19a inclined with respect to the rotation center axis Ax1, and presses a tip end portion of the elastic pair 17 in the axial direction by the pressing surface 19a. A bearing 25 is interposed between the pressing member 19 and the arm portion 15b, and the pressing member 19, the elastic body 17, and the detection element 18 are rotatable relative to the arm portion 15b. The pressing member 19, the elastic body 17, and the detection element 18 rotate integrally with the arm portion 14b (lever member 14).

In the above-described configuration, when the pedal 2 is depressed, the lever member 14 rotates about the rotation center axis Ax1, and the conversion mechanism 20 converts the rotation of the lever member 14 into the relative movement in the axial direction between the lever member 14 and the lever member 15, thereby converting the rotation torque of the lever member 14 into the thrust force which is the force in the axial direction. At this time, the lever member 15 moves in the axial direction (Y direction) and presses the elastic body 17 in the axial direction via the pressing member 19. Accordingly, the elastic body 17 is elastically deformed. That is, the elastic body 17 is elastically deformed by the thrust force. The detection element 18 detects and outputs the deformation amount of the elastic body 17. The deformation amount of the elastic body 17 is an example of an operation amount of the pedal 2. Since the deformation amount of the elastic body 17 is in a proportional relationship with a depression force applied to the pedal 2, the depression force can be calculated based on information (formula or table) indicating a relationship between the deformation amount of the elastic body 17 and the depression force.

As described above, in the present embodiment, the operation amount detection device 3 includes the lever member 14 (first member), the lever member 15 (second member), the conversion mechanism 20, the elastic body 17, and the detection element 18. The lever member 14 rotates about the rotation center axis Ax1 by the operation force input to the pedal 2, and transmits the rotation torque. The lever member 15 is rotatable about the rotation center axis Ax1, is movable relative to the lever member 14 in the axial direction of the rotation center axis Ax1, and is interposed between the lever member 14 and the reaction force member 22, and the reaction force of the rotation torque transmitted from the lever member 14 is received from the reaction force member 22. The conversion mechanism 20 converts the rotation of the lever member 14 into the relative movement between the lever member 14 and the lever member 15 in the axial direction, thereby converting the rotation torque into the thrust force which is the force in the axial direction. The elastic body 17 is provided apart from the reaction force member 22 and elastically deformed by the thrust force. The detection element 18 is fixed to the elastic body 17 and detects the deformation amount of the elastic body 17.

According to such a configuration, since the detection element 18 is fixed to the elastic body 17 provided apart from the reaction force member 22, an arrangement of the detection element 18 is less likely to be restricted by the reaction force member 22.

The elastic body 17 and the detection element 18 are positioned between the lever member 14 and the lever member 15 in the axial direction and rotate about the rotation center axis Ax1 integrally with the lever member 14.

According to such a configuration, since the elastic body 17 and the detection element 18 rotate integrally with the lever member 14 about the rotation center axis Ax1, a configuration (bearing) of rotatably supporting the elastic body 17, the detection element 18, and the lever member 14 is easily simplified as compared with a configuration in which the elastic body 17 and the detection element 18 rotate separately from the lever member 14 and the lever member 15.

In the above description, as an example, the configuration is described in which the elastic body 17 and the detection element 18 are positioned between the lever member 14 and the lever member 15 in the axial direction and rotate about the rotation center axis Ax1 integrally with the arm portion 14b of the lever member 14 (first member), but the embodiment disclosed here is not limited thereto. The elastic body 17 and the detection element 18 may be positioned between the lever member 14 and the lever member 15 in the axial direction and rotate about the rotation center axis Ax1 integrally with the arm portion 15b of the lever member 15 (second member). According to such a configuration, since the elastic body 17 and the detection element 18 rotate integrally with the lever member 15 about the rotation center axis Ax1, a configuration (bearing) of rotatably supporting the elastic body 17, the detection element 18, and the lever member 15 is easily simplified as compared with the configuration in which the elastic body 17 and the detection element 18 rotate separately from the lever member 14 and the lever member 15.

Second Embodiment

Figure 4:
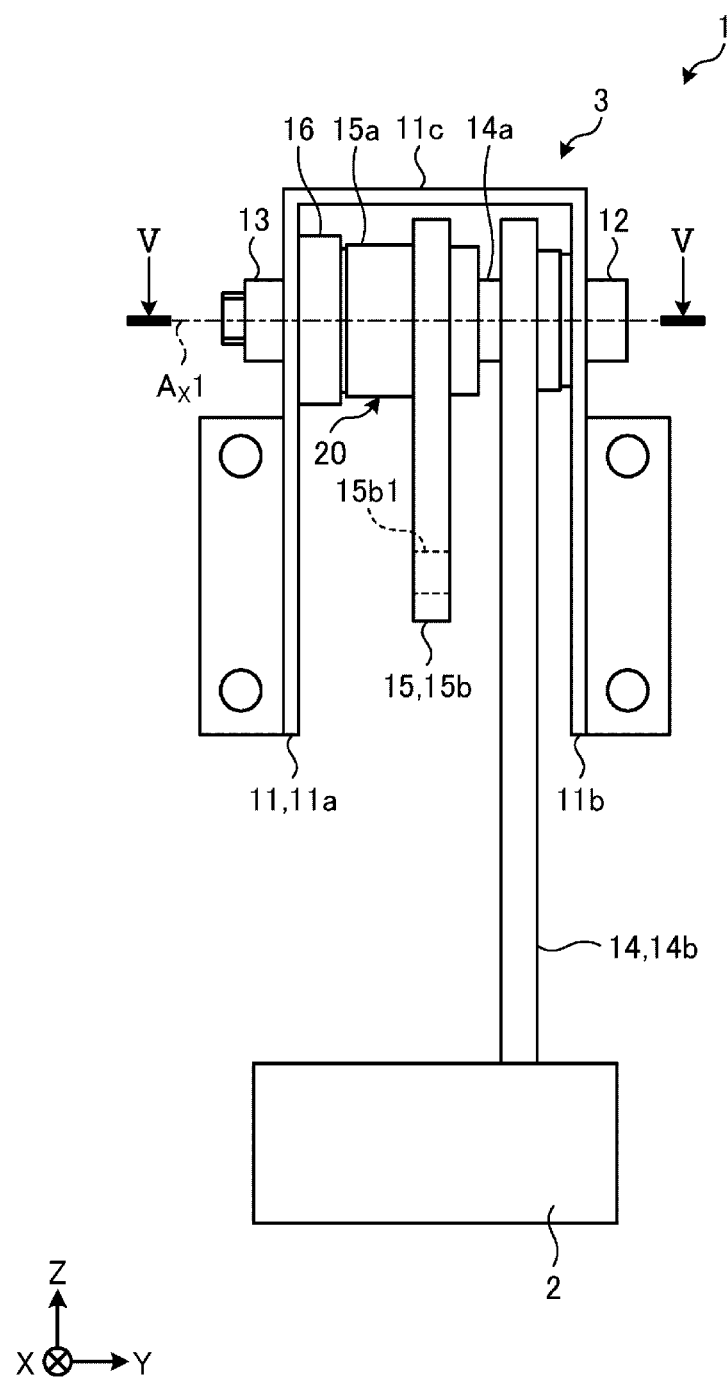
FIG. 4 is a front view showing a pedal device according to a second embodiment.
Figure 5:
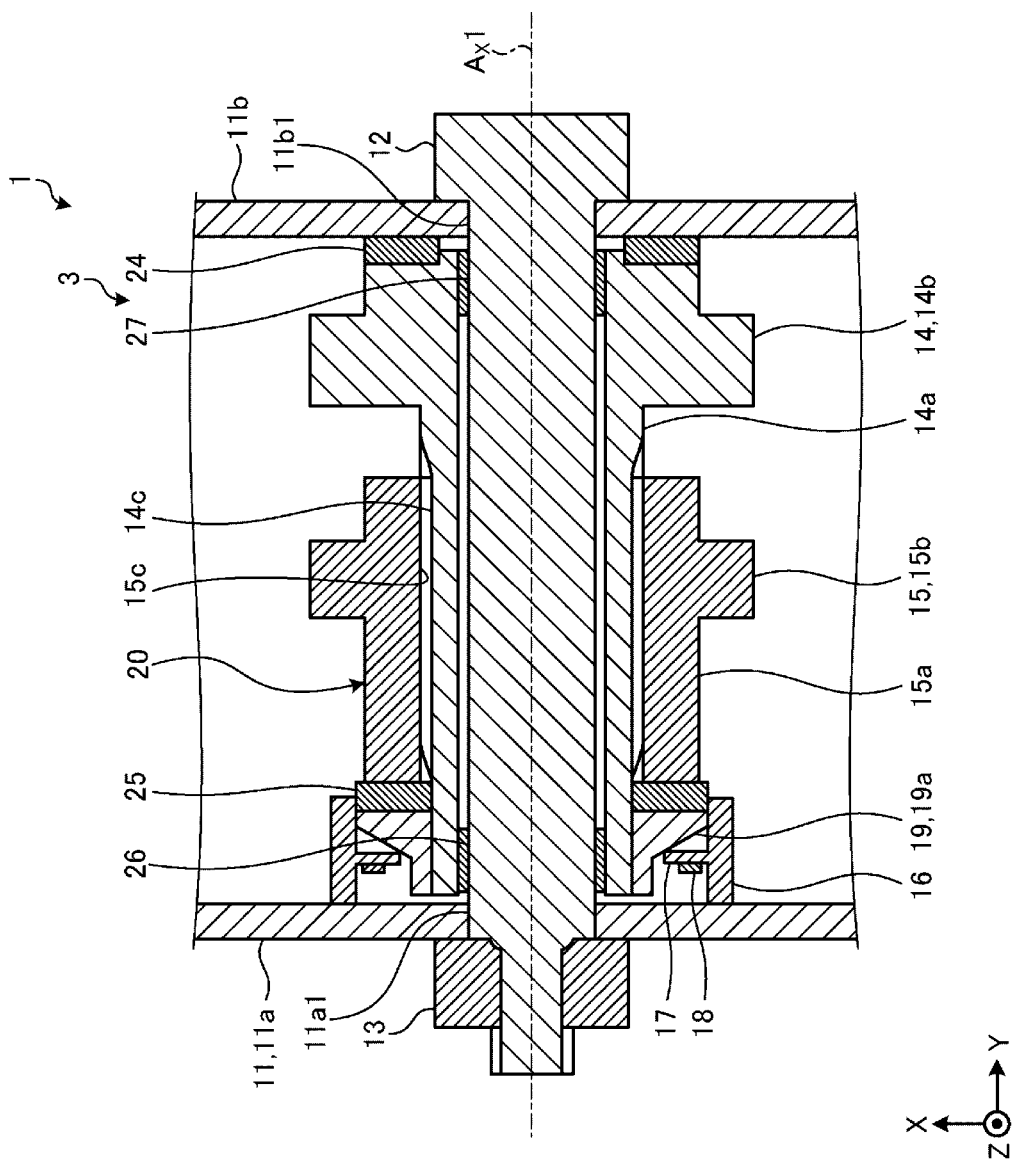
FIG. 5 is a cross-sectional view taken along a line V-V in FIG. 4.

FIG. 4 is a front view showing the pedal device 1 according to a second embodiment. FIG. 5 is a cross-sectional view taken along a line V-V in FIG. 4.

As shown in FIGS. 4 and 5, in the present embodiment, the lever member 14 and the lever member 15 are positioned between the two wall portions 11a and 11b, and relatively move in directions apart from each other in the axial direction by the operation force, and the lever member 14 is pressed against the wall portion 11b.

The elastic body 17 and the detection element 18 are positioned between the two wall portions 11a and 11b and fixed to the wall portion 11a.

As described above, in the present embodiment, the lever member 14 and the lever member 15 are positioned between the two wall portions 11a and 11b, and relatively move in the directions apart from each other in the axial direction by the operation force, and the lever member 14 is pressed against the wall portion 11b.

According to such a configuration, since the lever member 14 is pressed against the wall portion 11b, an occurrence of rattling of the lever member 14 in the axial direction is prevented.

The elastic body 17 and the detection element 18 are positioned between the two wall portions 11a and 11b and fixed to the wall portion 11a.

According to such a configuration, wiring routing and assembling workability of the detection element 18 are improved.

Third Embodiment

Figure 6:
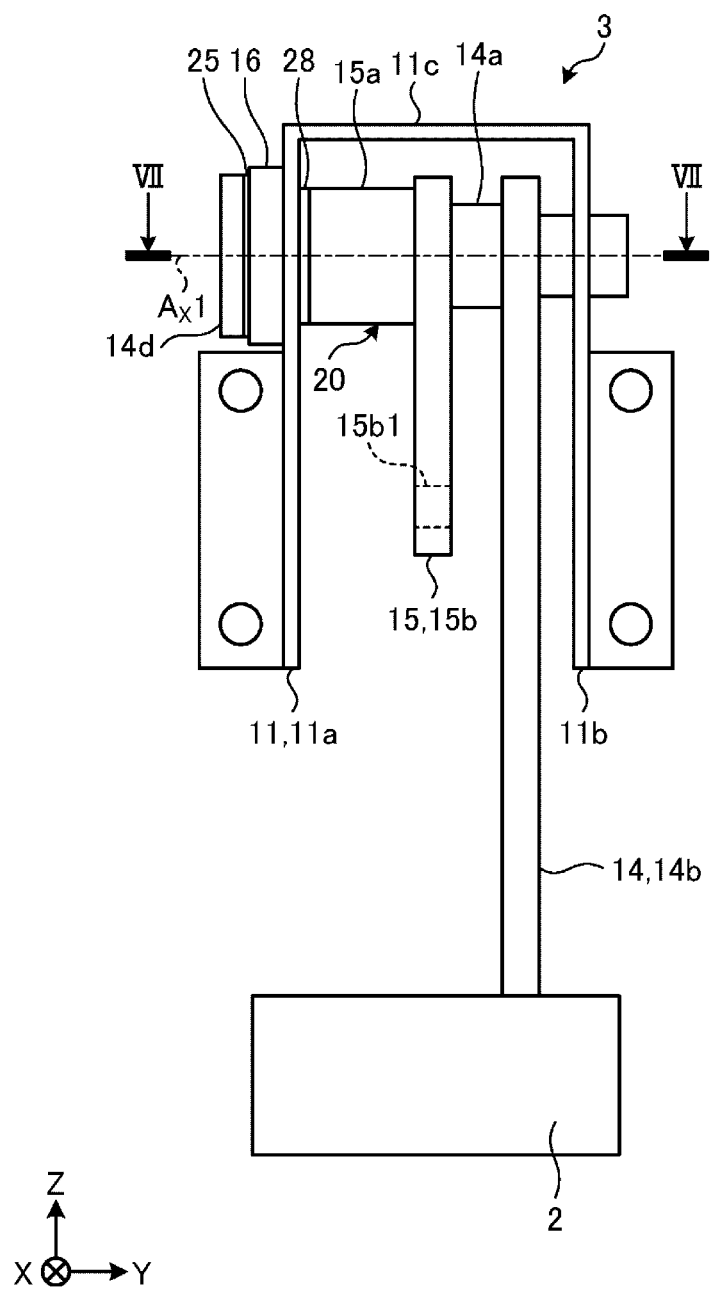
FIG. 6 is a front view showing a pedal device according to a third embodiment.
Figure 7:
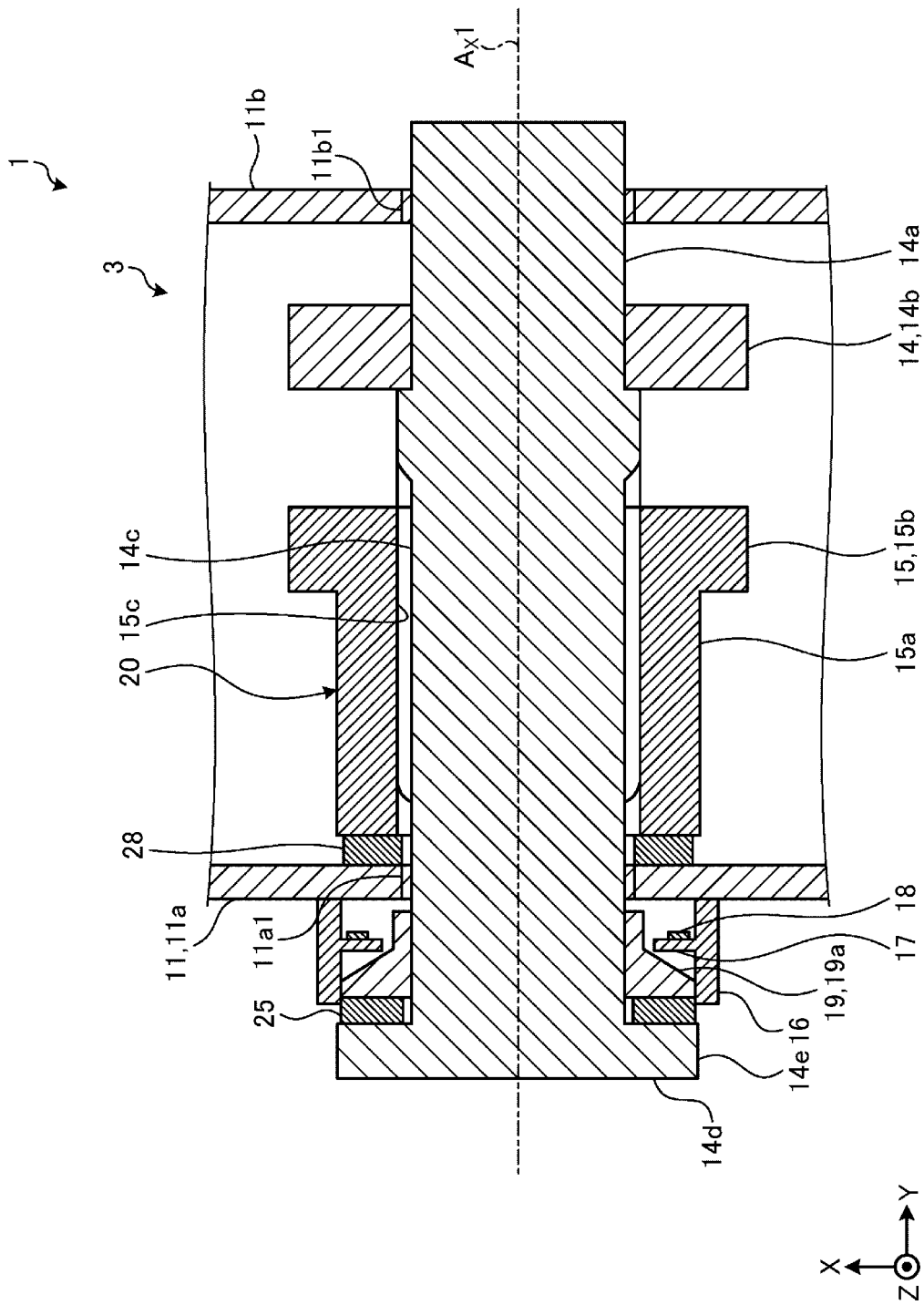
FIG. 7 is a cross-sectional view taken along a line VII-VII in FIG. 6.

FIG. 6 is a front view showing the pedal device 1 according to a third embodiment. FIG. 7 is a cross-sectional view taken along line VII-VII in FIG. 6.

As shown in FIGS. 6 and 7, in the present embodiment, an end portion 14d of the lever member 14 on an opposite side from the Y direction is positioned outside the two wall portions 11a and 11b, and a flange portion 14e is provided on the end portion 14d. The flange portion 14e is positioned outside the two wall portions 11a and 11b.

In the present embodiment, the support member 16, the elastic body 17, the detection element 18, the pressing member 19, and the bearing 25 are positioned outside the two wall portions 11a and 11b and between the flange portion 14e and the wall portion 11a. The elastic body 17 and the detection element 18 are positioned outside the two wall portions 11a and 11b and fixed to the wall portion 11a.

In the above configuration, the lever member 14 and the lever member 15 relatively move in directions approaching each other in the axial direction by the operation force, and sandwich the wall portion 11a.

According to such a configuration, since the lever member 14 and the lever member 15 sandwich the wall portion 11a, an occurrence of rattling of the lever member 14 and the lever member 15 in the axial direction is prevented.

The elastic body 17 and the detection element 18 are positioned outside the two wall portions 11a and 11b and fixed to the wall portion 11a.

According to such a configuration, the wiring routing and the assembling workability of the detection element 18 are improved.

Fourth Embodiment

Figure 8:
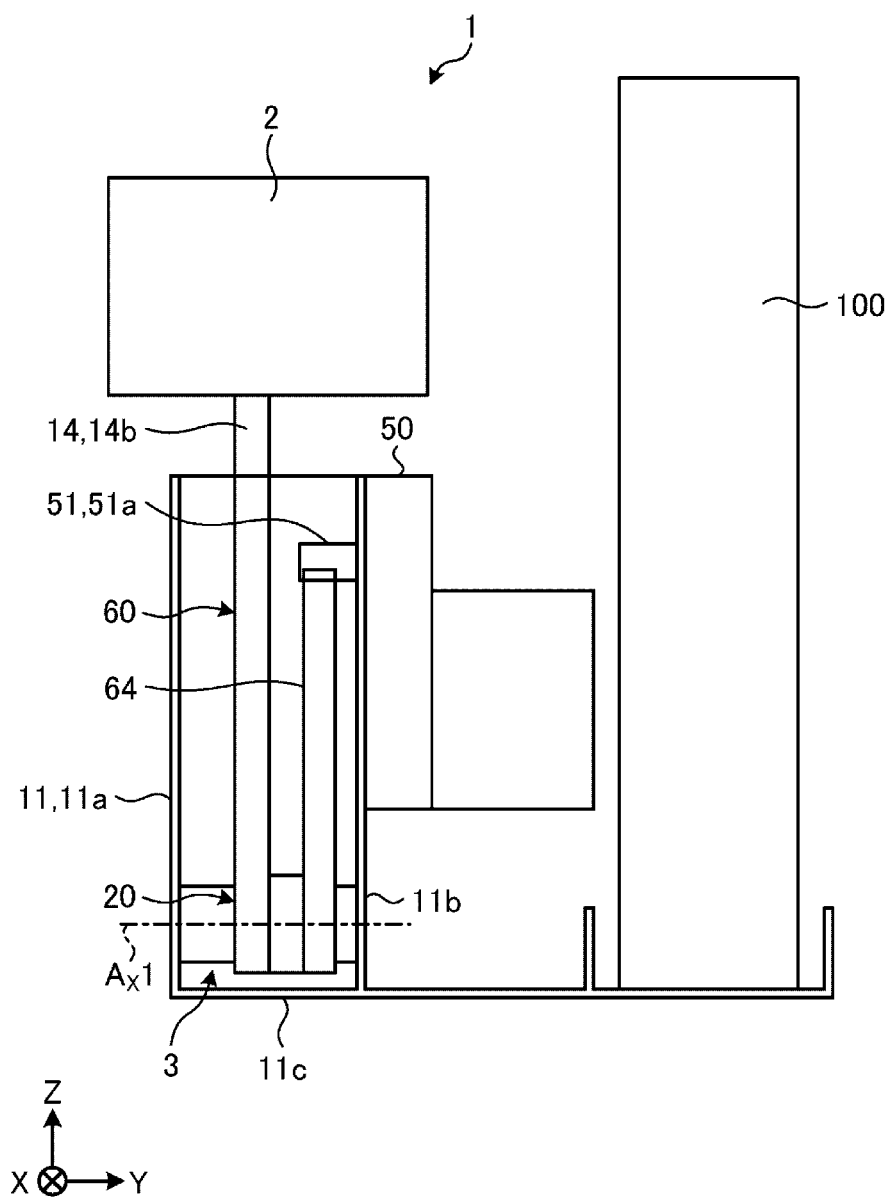
FIG. 8 is a front view showing a pedal device according to a fourth embodiment.
Figure 9:
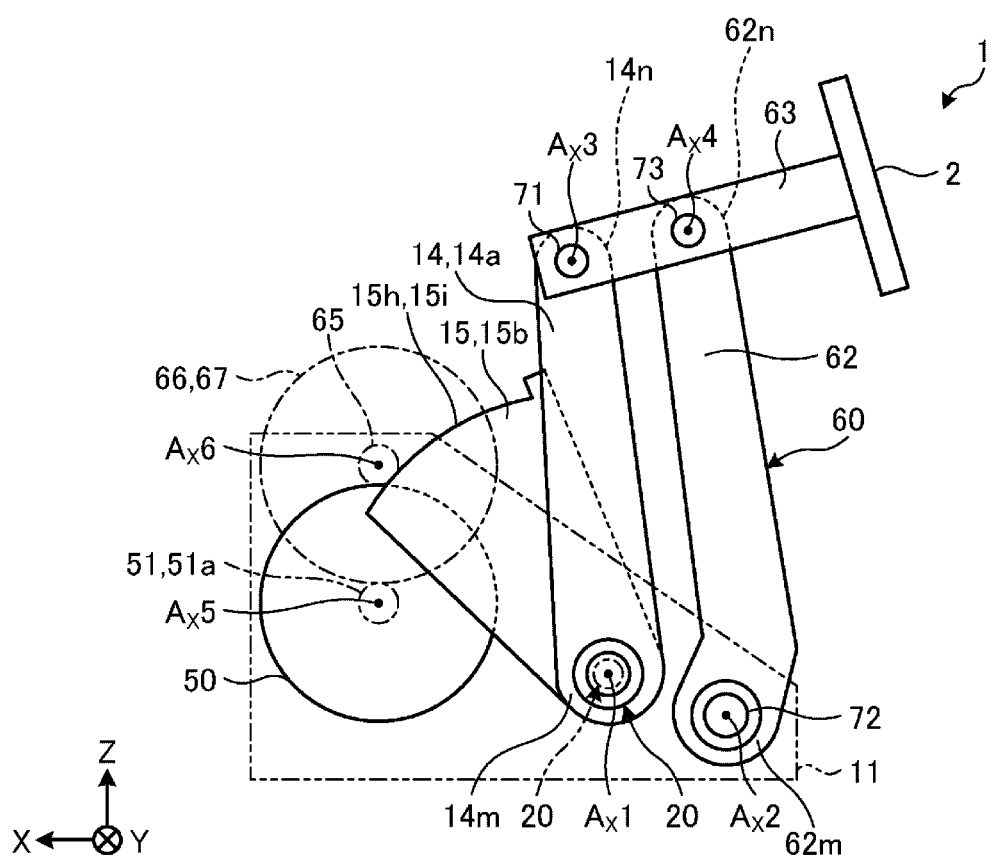
FIG. 9 is a side view showing the pedal device according to the fourth embodiment, and shows a state in which a pedal is positioned at an initial position.
Figure 10:
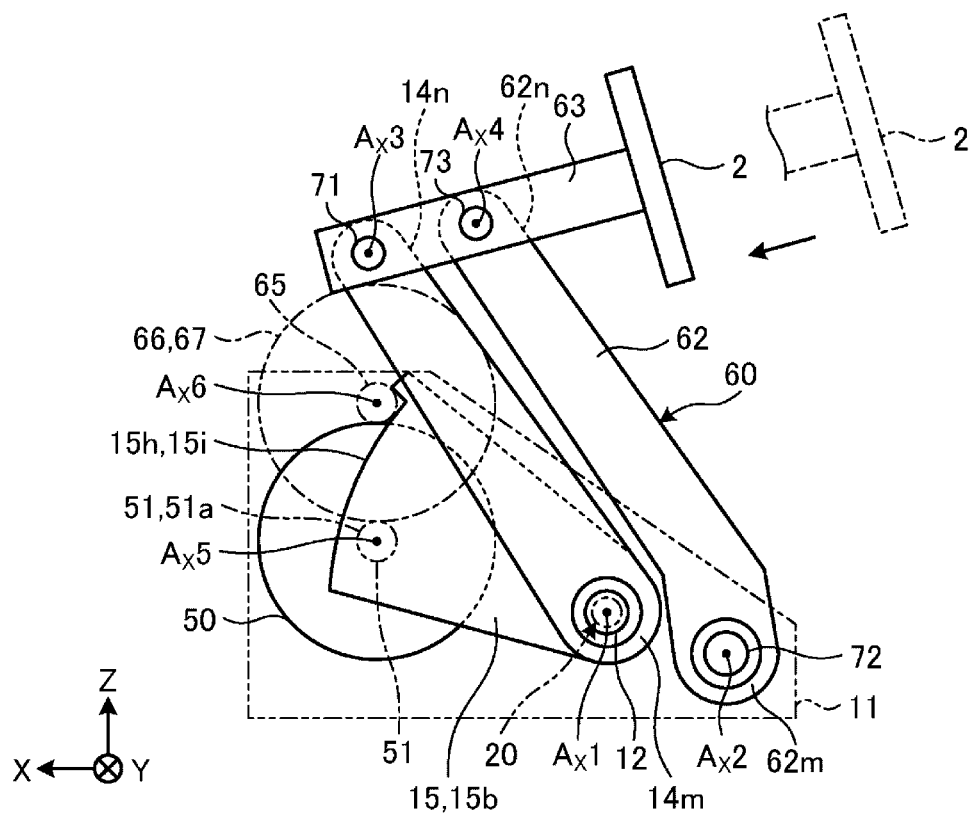
FIG. 10 is a side view showing the pedal device according to the fourth embodiment, and shows a state in which the pedal is positioned at a maximum depression position.

FIG. 8 is a front view showing the pedal device 1 according to a fourth embodiment. FIG. 9 is a side view showing the pedal device 1 according to the fourth embodiment, and shows a state in which the pedal 2 is positioned at an initial position. FIG. 10 is a side view showing the pedal device 1 according to the fourth embodiment, and shows a state in which the pedal 2 is positioned at a maximum depression position.

As shown in FIGS. 8 to 10, the present embodiment is different from the first embodiment in that the pedal device 1 includes a motor 50 as a reaction force generation device, a link mechanism 60, and a speed reduction mechanism 66. The pedal device 1 is disposed beside an accelerator pedal device 100.

The link mechanism 60 is a parallel link. Specifically, the link mechanism 60 includes the lever member 14, a lever member 62, and a connection link 63.

The pedal 2 is fixed to the connection link 63. One end portion 14m of the lever member 14 is supported by the support member 11 in a manner of being rotatable about the rotation center axis Ax1. The other end portion 14n of the lever member 14 is connected to the connection link 63 via a shaft 71 in a manner of being relatively rotatable about a rotation center axis Ax3 with respect to the connection link 63. One end portion 62m of the lever member 62 is supported by the support member 11 via a shaft 72 in a manner of being rotatable about a rotation center axis Ax2. The shaft 72 is provided with a rotation sensor that detects a rotation amount of the lever member 62. The other end portion 62n of the lever member 62 is connected to the connection link 63 via a shaft 73 in a manner of being relatively rotatable about a rotation center axis Ax4 with respect to the connection link 63. That is, the connection link 63 connects the other end portion 14n of the lever member 14 on an opposite side from the rotation center axis Ax1 and the other end portion 62n of the lever member 62 on an opposite side from the rotation center axis Ax2. The connection link 63 supports the pedal 2 such that the pedal 2 is movable in a direction orthogonal to the rotation center axis Ax1.

The motor 50 includes a rotation shaft 51, and the rotation shaft 51 rotates about a rotation center axis Ax5. When power is supplied, the motor 50 generates a reaction force torque, which is a reaction force of the operation force, on the rotation shaft 51. The motor 50 is a motor with a brake capable of braking the rotation shaft 51.

The speed reduction mechanism 66 is interposed between the lever member 14 and the rotation shaft 51. The speed reduction mechanism 66 includes the fan-shaped lever member 15 and gears 65 and 67. The lever member 15 is connected to the lever member 14 via the conversion mechanism 20. The lever member 15 rotates about the rotation center axis Ax1 in the same direction as the lever member 14 as the lever member 14 rotates. In the present embodiment, the lever member 15 is formed in the fan shape, and teeth 15i are provided on an arc-shaped edge portion 15h of the lever member 15. That is, the lever member 15 is a fan-shaped gear.

The gear 65 is supported by the support member 11 in a manner of being rotatable about a rotation center axis Ax6. The gear 65 meshes with the lever member 15. The lever member 15 is fixed to the gear 65 and rotates about the rotation center axis Ax6 integrally with the gear 65. A diameter of the lever member 15 is larger than that of the gear 65. The number of teeth of the lever member 15 is larger than that of the gear 65. The lever member 15 meshes with a gear 51a provided on an outer peripheral surface of the rotation shaft 51 of the motor 50. The rotation center axes Ax1 to Ax6 are parallel to one another.

The speed reduction mechanism 66 having the above-described configuration amplifies the reaction force torque of the rotation shaft 51 of the motor 50, converts the reaction force torque into a torque about the rotation center axis Ax1, and transmits the torque to the lever member 14. Accordingly, the motor 50 may be relatively small.

The lever member 14 and the motor 50 are positioned on an opposite side from the pedal 2 with respect to the lever member 62. The rotation center axes Ax1, Ax2, and Ax5 are positioned below the pedal 2.

In the above configuration, when the pedal 2 is subjected to the depression operation, the pedal 2 moves in the direction orthogonal to the rotation center axis Ax1 while being supported by the link mechanism 60. Due to deformation of the link mechanism 60, the lever member 15 rotates about the rotation center axis Ax1, the gears 65 and 67 rotate about the rotation center axis Ax6, and the operation force of the pedal 2 is transmitted from the lever member 15 to the rotation shaft 51 of the motor 50.

Figure 11:
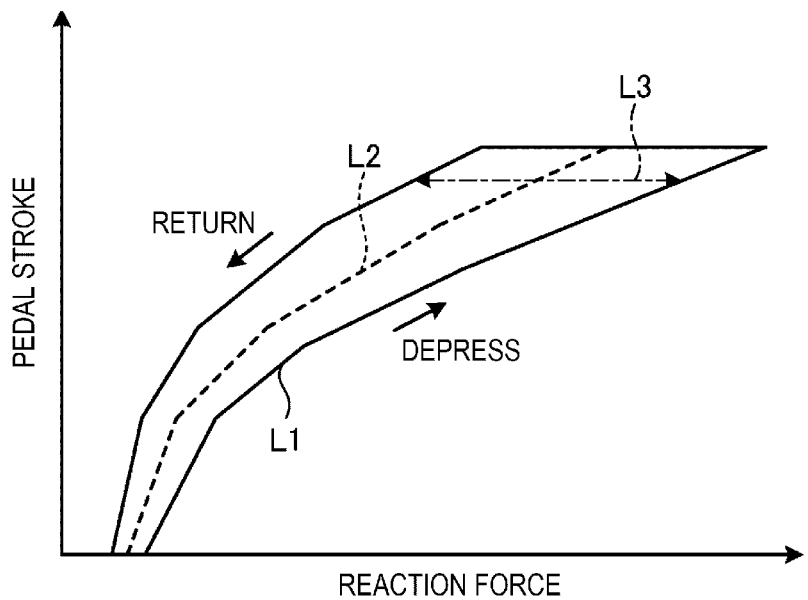
FIG. 11 is a diagram showing a relationship between a reaction force and a pedal stroke under control of a motor of the pedal device according to the fourth embodiment.

FIG. 11 is a diagram showing a relationship between a reaction force and a pedal stroke under control of the motor 50 of the pedal device 1 according to the fourth embodiment. A horizontal axis in FIG. 11 indicates a magnitude of the reaction force generated by the motor 50, and a vertical axis in FIG. 11 indicates an amount of the stroke of the pedal 2. A line L1 in FIG. 11 indicates a sum of the reaction force generated by the motor on the rotation shaft 51 and a frictional force generated by the brake. A line L2 in FIG. 11 indicates the reaction force generated by the motor 50 on the rotation shaft 51, and a line L3 indicates a magnitude of the frictional force. The motor 50 is controlled by a control device so as to generate the reaction force indicated by the line L1 in FIG. 11.

As described above, in the present embodiment, the lever member 14 constitutes a link of the link mechanism 60 (parallel link). According to such a configuration, a movement trajectory of the pedal 2 is easily brought close to a straight line by the link mechanism 60 (parallel link).

While certain embodiments disclosed here have been described, these embodiments have been presented by way of example only, and are not intended to limit the scope of the disclosure. Novel embodiments can be implemented in various forms, and various omissions, substitutions, and modifications can be made without departing from the gist of the disclosure. The accompanying claims and their equivalents are intended to cover such embodiments or modifications as would fall within the scope and spirit of the disclosure.

REFERENCE SIGNS LIST

2: pedal
3: operation amount detection device
11: support member
11a, 11b: wall portion
14: lever member (first member)
15: lever member (second member)
17: elastic body
18: detection element
20: conversion mechanism
22: reaction force member
60: link mechanism (parallel link)
Ax1: rotation center axis

The invention claimed is:

1. An operation amount detection device comprising:
a first member configured to rotate about a rotation center axis by an operation force input to a pedal and transmit a rotation torque;
a second member configured to receive, from a reaction force member, a reaction force of the rotation torque transmitted from the first member, the second member being rotatable about the rotation center axis and movable relative to the first member in an axial direction of the rotation center axis, and being interposed between the first member and the reaction force member;
a conversion mechanism configured to convert rotation of the first member into a relative movement of the first member and the second member in the axial direction to convert the rotation torque into a thrust force which is a force in the axial direction;
an elastic body provided apart from the reaction force member and configured to be elastically deformed by the thrust force; and
a detection element fixed to the elastic body and configured to detect a deformation amount of the elastic body.

2. The operation amount detection device according to claim 1, wherein
the elastic body and the detection element are positioned between the first member and the second member in the axial direction and rotate about the rotation center axis integrally with the first member or the second member.

3. The operation amount detection device according to claim 1, comprising:
a support member including two wall portions that are apart from each other in the axial direction and that support the first member and the second member such that the first member and the second member are rotatable about the rotation center axis, wherein
the first member and the second member are positioned between the two wall portions, and relatively move in directions apart from each other in the axial direction by the operation force, and the first member is pressed against one of the wall portions.

4. The operation amount detection device according to claim 3, wherein
the elastic body and the detection element are positioned between the two wall portions and fixed to the other one of the wall portions.

5. The operation amount detection device according to claim 1, comprising:
a support member including two wall portions that are apart from each other in the axial direction and that support the first member and the second member such that the first member and the second member are rotatable about the rotation center axis, wherein
the first member and the second member relatively move in directions approaching each other in the axial direction by the operation force and sandwich one of the wall portions.

6. The operation amount detection device according to claim 5, wherein
the elastic body and the detection element are positioned outside the two wall portions and fixed to the one of the wall portions.

7. The operation amount detection device according to claim 1, wherein
the first member constitutes a link of a parallel link.

8. The operation amount detection device according to claim 1, wherein the relative movement of the first member and the second member is cause by a helical gear engagement.

* * * * *